United States Patent [19]

Kirschner

[11] 3,970,317

[45] July 20, 1976

[54] APPARATUS FOR INHIBITING A PLURALITY OF DISC RECORDS FROM BEING DISPOSED ON A TURNTABLE AND GROUNDING A DISC RECORD DISPOSED ON THE TURNTABLE

[75] Inventor: Thomas Francis Kirschner, Indianapolis, Ind.

[73] Assignee: RCA Corporation, New York, N.Y.

[22] Filed: Apr. 29, 1975

[21] Appl. No.: 572,786

[52] U.S. Cl. .............................. 274/105; 274/39 R

[51] Int. Cl.[2] .............................. G11B 17/04

[58] Field of Search .............................. 274/39 R, 105

[56] References Cited

UNITED STATES PATENTS

| | | | |
|---|---|---|---|
| 3,871,663 | 3/1975 | Stave | 274/105 |
| 3,888,493 | 6/1975 | Torrington et al. | 274/39 R |

*Primary Examiner*—Richard E. Aegerter
*Assistant Examiner*—Steven L. Stephan
*Attorney, Agent, or Firm*—Eugene M. Whitacre; William H. Meagher; Dilip A. Kulkarni

[57] ABSTRACT

In a system for playing back prerecorded signals from a centrally apertured and grooved disc record having an exposed conductive region surrounding the aperture susceptible of accumulating electrical charge of sufficient magnitude to damage a groove-engaging signal pickup for transducing the disc record, an apparatus for inhibiting a plurality of disc records from being disposed on the player turntable while grounding the conductive region of a disc record disposed on the turntable is provided. An engaging member is mounted to a centering spindle secured to the turntable for rotation in a first and a second direction in response, respectively, to the passage of a disc record to-and-from a playback position of the disc record on the turntable. If a disc record is disposed on the turntable, the conductive region of the disc record is located remote from the turntable. When a first disc record is placed on the turntable in the playback position, a conductive portion of the engaging member extends sufficiently to engage the conductive region of the first disc record in order (1) to electrically connect the conductive region which is remote from the turntable to ground potential of the playback system via the turntable spindle, and (2) to inhibit rotation of the engaging member in the first direction, thereby preventing a second disc record from being placed on the turntable.

5 Claims, 8 Drawing Figures

58 48 47 46 45 58 36 40 36 31 54 41 54 39 44 44 39 16 14 37 37 14 16 12 35 35 53 61 32 53 11 33 34

TELEVISION
VIDEO SIGNAL PROCESSOR
DEMODULATOR
VELOCITY ERROR DETECTOR
SYNC SEPARATOR
PICKUP CICUIT
TRANSDUCER 48
50
49
50
49
46
47
31
45
41

42
42
43
43
40
52
39
39
52
53
54
53
36
36
44
44
37
37
51
35
35
38
38
51
32
61
34
55
55

APPARATUS FOR INHIBITING A PLURALITY OF DISC RECORDS FROM BEING DISPOSED ON A TURNTABLE AND GROUNDING A DISC RECORD DISPOSED ON THE TURNTABLE

The invention relates generally to mechanisms for a player of the type employing a disc record having a conductive portion capable of accumulating electrical charge thereon, and more particularly to an apparatus for (1) grounding the conductive portion of a disc record disposed on the turntable of the player and which portion is located remote from the turntable, and (2) preventing placement of more than one disc record at one time in operative position on the turntable.

BACKGROUND OF THE INVENTION

In certain video disc systems, video information is recorded by means of geometric variations in the bottom of a smooth spiral groove on the surface of a disc record. The disc record surface includes a coating of conductive material which is preferably covered with a thin deposit of dielectric material. A signal pickup, supported by a pickup arm, engages the spiral groove and includes a conductive electrode which establishes a capacitance with the conductive coating and the dielectric deposit of the disc record. If the disc record is disposed on a turntable of the player in a playback position, the conductive coating is located remote from the turntable. When the disc record is rotated, the signal pickup/disc record capacitance varies in response to the geometric variations in the bottom of the spiral groove passing beneath. The capacitance variations are converted to electrical variations by a suitable signal processing circuitry coupled to the signal pickup electrode. The output signal of the signal processing circuitry may be fed to a conventional television receiver for audio/visual presentation. The other end of the pickup arm is releasably secured by a coupler to a support member of a supporting structure of the playback system. A system of the aforementioned type is described in detail in the U.S. Pat. No. 3,842,194, issued to John Kaufmann Clemens, on Oct. 15, 1974, and entitled "INFORMATION RECORDS AND RECORDING/PLAYBACK SYSTEMS THEREFOR".

Illustratively, (as described, for example, in the copending U.S. Pat. application, Ser. No. 295,854, filed Oct. 10, 1972, for S. E. Hilliker, entitled "VIDEO DISC TRANSMISSION LINE AND STYLUS RF RETURN systems", and now U.S. Pat. No. 3,872,265), the capacitive variations between the conductive coating on the disc record and the conductive electrode of the signal pickup are a part of a tuned circuit, wherein the resonant frequency of the tuned circuit varies as the capacitance between the signal pickup and the disc record changes. A flexibly mounted conductive member (e.g., pickup arm) is provided, with the free end coupled to the conductive electrode of the signal pickup, and the pivoted end movably connected to a hollow box-like support housing also made of conductive material. The conductive member mechanically supports the signal pickup, and also forms a transmission line with the surrounding conductive support housing. The conductive coating side of the variable disc record/signal pickup capacitance is returned to the conductive housing via a capacitance established between (1) the disc record conductive coating and a portion of the conductive housing overlying the disc record conductive coating, and/or (2 ) via a capacitance established between the disc record conductive coating and a conductive portion provided in the turntable which is, in turn, connected to the conductive support housing during playback. A tuned circuit is established which includes (1) reactance of the transmission line, (2) the capacitance between the signal pickup electrode and the disc record conductive coating, and (3) the capacitance between the conductive housing and the disc record conductive coating, and/or the capacitance between the disc record conductive coating and the turntable conductive portion. The tuned circuit is energized by a fixed, high frequency (for example, 915 MHz) oscillator. The response of the tuned circuit to the energization signal from the oscillator changes as a function of the prerecorded information on the disc record. This provides output signals, representative of prerecorded information on the disc record, which are subsequently fed to a suitable signal processing circuit.

In order to obtain adequate bandwidth for monochrome and color display in video disc systems, the disc record is rotated at relatively high playback speeds (e.g., in some video disc systems up to 1,500 rpm) as compared with low playback speeds (e.g., 33⅓ rpm) associated with conventional audio disc systems. The use of high speed of disc record rotation entails a rapid rate of intimate relative motion between the disc record groove surface (e.g., polystyrene coating) and the conforming signal pickup tip (e.g., finely lapped sapphire or glass base) as the signal pickup rides in the disc record groove during playback, which results in charge accumulation on the disc record surface of several hundred volts (e.g., up to 2,000 volts). Moreover, it has been also found that as the disc record having two conductive coatings (e.g., the disc record having prerecorded information on both sides) separated by the dielectric substrate is pulled out from the disc record storage sleeve, electrical charge builds up on the dielectric deposits overlying the conductive coatings. The electrical charge on the dielectric deposits induces opposite charge on the adjacent disc record conductive coatings.

The build-up of electrical charge on the disc record conductive coating is undesirable for several reasons. First, the charge build-up is a safety hazard. It may cause arcing with the surrounding metal structure with a possibility of initiating an unfriendly fire. Also, it may give an electric shock to humans upon an accidental contact with the charged disc record while handling the player.

Second, in the playback systems of the aforementioned type, the following considerations may be encountered. One, groove-engaging and low mass requirements of such a typical signal pickup apparatus utilized in the above-mentioned systems results in a pickup arm unit which is extremely fragile (e.g., signal pickup width 2 microns, and signal pickup depth 5 microns). Two, the dimension of the electrode of the signal pickup along the spiral groove of the disc record must be commensurate with the resolution requirements of high frequency signals (e.g., 4.3 to 6.3 MHz) recorded in the bottom of the disc record groove (illustratively, signal pickup electrode dimension along the groove of 0.2 microns). Therefore, electrical charge on the disc record may discharge through the delicate signal pickup electrode causing permanent damage to the groove-engaging signal pickup.

As indicated above, the A–C return path for the conductive coating side of the signal varying disc record/signal pickup capacitance must be provided. It may also be advantageous to provide a D–C return path for the conductive coating side of the signal varying disc record/signal pickup capacitance in order to remove electrical charge accumulated on the disc record conductive coating which may deleteriously affect the performance of the video disc playback system. Therefore, it is desirable to ground the disc record conductive coating to a reference potential (e.g., ground potential) of the playback system.

Further, in order to insure that the disc record/signal pickup capacitance variations produce variations in the resonant frequency of the tuned circuit of adequate magnitude, it is desirable to make the series capacitance established between the disc record conductive coating and the conductive housing overlying the disc record conductive coating as large as possible. The capacitance of a capacitor is (1) directly proportional to the area of the capacitor plates, (2) inversely proportional to the separation between the capacitor plates, and (3) directly proportional to the dielectric constant of the material separating the capacitor plates. For a given area of the capacitor plates and a specified dielectric material separating the capacitor plates, the capacitance of the capacitor may be made large by locating the conductive housing as close as possible to the disc record conductive coating during playback. Thus, if the conductive housing is spaced close to the disc record conductive coating (e.g., 0.050 to 0.150 inches), addition of a second disc record (e.g., 0.075 inches thick) on top of a first disc record may cause irreparable damage to the second disc record, and/or to the record-engaging signal pickup. Thus, it is desirable to provide an apparatus for inhibiting the introduction of a second disc record into operable position on the turntable in the presence of a first disc record disposed in the operable position on the turntable.

SUMMARY OF THE INVENTION

In a system for playing back prerecorded signals from a centrally apertured and grooved disc record having a conductive region surrounding the aperture susceptible of accumulating electrical charge of sufficient magnitude to damage a groove-engaging signal pickup provided for transducing the disc record, an apparatus for inhibiting a plurality of disc records from being disposed on the player turntable while grounding the conductive region of the disc record disposed on the turntable is provided. Engaging means is mounted to a centering spindle secured to the turntable for movement in a first and a second direction in response, respectively, to the passage of a disc record to-and-from a playback position of the disc record on the turntable. If a disc record is disposed on the turntable, the conductive region of the disc record is located remote from the turntable. When a first disc record is placed on the turntable in the playback position, a conductive portion of the engaging means extends sufficiently to engage the conductive region of the first disc record in order to (1) electrically connect the conductive region which is remote from the turntable to a reference potential of the playback system via the turntable spindle, and (2) to inhibit movement of the engaging means in the first direction, thereby preventing a second disc record from being placed on the turntable. Means are provided for biasing the conductive portion of the engaging means into engaging relation with the conductive region of the first disc record disposed on the turntable in the playback position.

BRIEF DESCRIPTION OF THE DRAWINGS

Other objects, features, and advantages of the present invention will be more fully understood from the following detailed description of the preferred embodiment, the appended claims, and accompanying drawings in which:

DETAILED DESCRIPTION OF THE PREFERRED EMBODIMENT

Figures 1, 2:
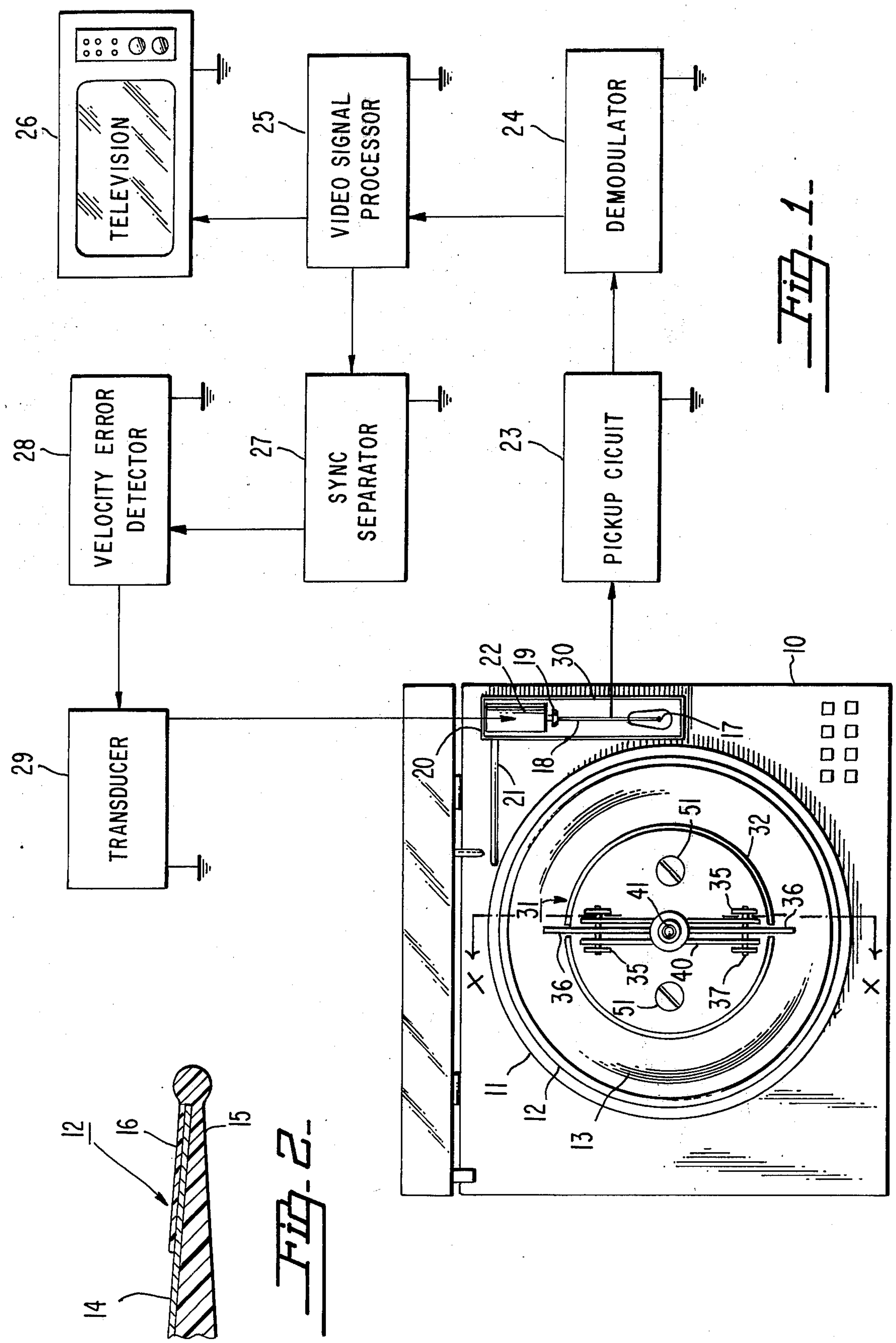
FIG. 1 illustrates, via a simplified block diagram representation, a video disc playback system incorporating an apparatus for inhibiting a plurality of disc records from being disposed on a turntable while grounding a conductive portion of a disc record disposed on the turntable pursuant to the principles of the present invention; the apparatus is shown with its cover removed for exposing the underlying detail.
FIG. 2 illustrates a sectional view of a portion of a disc record having a dielectric base and a dielectric deposit overlying a conductive coating on the dielectric base suitable for use with the video disc playback system of FIG. 1.

FIG. 1 illustrates a video disc player having a base 10. The player is suitable for use in a video disc playback system such as disclosed in the aforementioned Clemens' patent (U.S. Pat. No. 3,842,194). A turntable 11 is rotatably mounted on the base 10. The upper surface of the turntable 11 is adapted to support a video disc record 12. Video information is recorded by means of geometrical variations impressed in the bottom of a smooth spiral groove 13 on the surface of the disc record 12. As illustrated in FIG. 2, the disc record 12 includes a conductive coating 14 on a base 15 of the disc record. The conductive coating 14 is preferably covered with a thin deposit 16 of dielectric material over the recorded portion of the disc record 12. Even though the disc record 12 is shown in FIG. 2 to have recording on one side only for reasons of simplicity, it will be seen that the disc record may as well have recording on both sides. A signal pickup 17, supported by a conductive pickup arm 18, engages the spiral groove 13 and includes a conductive electrode (not shown) which, together with the conductive coating and the dielectric deposit, form a capacitor. If the disc record 12 is disposed on the turntable in a playback position, the conductive coating is located remote from the turntable. When relative motion is established between the signal pickup 17 and the disc record 12, an edge of the electrode included in the signal pickup, while riding in the smooth spiral groove 13, serves as an electrode of a capacitor varying due to the geometric variations in the bottom of the spiral groove passing underneath. The other end of the pickup arm 18 is releasably secured to a support member 19 carried by a pickup arm supporting structure 20.

The pickup arm supporting structure 20 comprises a signal pickup radial feed drive mechanism 21 and a translatory motion imparting means 21. The radial feed drive mechanism 21 traverses the pickup arm support 19 during playback independent of the motion of the signal pickup 17 due to the spiral groove 13, and in proper time relationship with the radial motion of the signal pickup tip engaged in the spiral groove so as to steadily maintain the longitudinal axis of the pickup arm 18 substantially tangential to the spiral groove at the point of the signal pickup/disc record engagement. Reference may be made to the U.S. Pat. No. 3,870,835, issued to Frederick R. Stave, and entitled "VIDEO DISC PLAYBACK APPARATUS", for an illustration of a suitable mechanism for providing the indicated radial motion.

The general arrangement of the video playback system will now be briefly described with reference to the block diagram of FIG. 1. The spirally grooved video disc record 12 rests upon the turntable 11 which is rotated by a suitable rotational drive mechanism (not shown) at a desired predetermined speed (e.g., 450 rpm). The electrode incorporated in the groove-engaging signal pickup 17 is electrically connected to the conductive pickup arm 18. A conductive support housing 30 encloses the conductive pickup arm 18 and, as indicated previously, forms a transmission line. Illustratively, the transmission line may be of the type shown in the copending U.S. Pat. application, Ser. No. 295,854, filed for S. E. Hilliker, entitled "VIDEO DISC TRANSMISSION LINE AND STYLUS RF RETURN SYSTEMS", and now U.S. Pat. No. 3,872,265. A pickup circuit 23 is electrically coupled to the afore-said transmission line and serves to translate the signal pickup/disc record variations to electrical signal variations representative of the prerecorded signal. Illustratively, the pickup circuit may be of the advantageous form shown in the copending U.S. Pat. application of D. J. Carlson et al., Ser. No. 451,103, filed Mar. 14, 1974, entitled "PICKUP APPARATUS FOR VIDEO DISC PLAYERS", and now U.S. Pat. No. 3,872,240.

The composite video signal appearing at the output of the pickup circuit 23 is supplied to a video signal processor 25, via a demodulator 24. The video signal processor 25 serves to process the demodulator 24 output to form suitable (e.g., such as NTSC form) for application to a conventional television receiver 26 for audio/visual presentation. Where the prerecorded composite video signal is representative of color pictures, and incorporates a chrominance component of a "buried subcarrier" form, the video signal processor 25 may be of the desirable form shown in the copending U.S. Application of J. G. Amery, Ser. No. 506,446, filed on Sept. 16, 1974, and entitled "COMB FILTER FOR VIDEO PROCESSING".

A sync separator 27, coupled to the output terminal of the video signal processor 25, serves to separate the picture tube deflection synchronizing components from the recovered composite prerecorded signal and develops a pulse train at its output corresponding to the horizontal synchronizing component of the prerecorded signal.

A velocity error detector 28, coupled to the sync separator 27, develops a direct voltage speed error correction signal at its output terminal having an amplitude which varies in response to the shifting frequency of the sync pulses (e.g., the detected horizontal sync pulse frequency vis-a-vis the standard frequency of 15.734 KHz) appearing at the output terminal of the sync separator 27. Illustratively, the velocity error detector 28 may be of the preferred form shown in the U.S. Pat. No. 3,711,641, issued to R. C. Palmer, on Jan. 16, 1973, and entitled "VELOCITY ADJUSTING SYSTEM".

An electromechanical transducer 29 (also known as "armstretcher") mechanically coupled to the pickup arm 20 carrying the signal pickup 17 varies the position of the signal pickup in relation to the disc record groove 13 in response to the speed error correction signal developed by the velocity error detector 28 in a manner that opposes deviations of the signal pickup/disc record relative speed from the predetermined speed (e.g., 450 rpm). Illustratively, the electromechanical transducer 28 may be of the recommended form shown in U.S. Pat. application No. B351,598, published for M. E. Miller et al., on Jan. 28, 1975, and entitled "VELOCITY CORRECTION SYSTEM WITH DAMPING".

Figure 3:
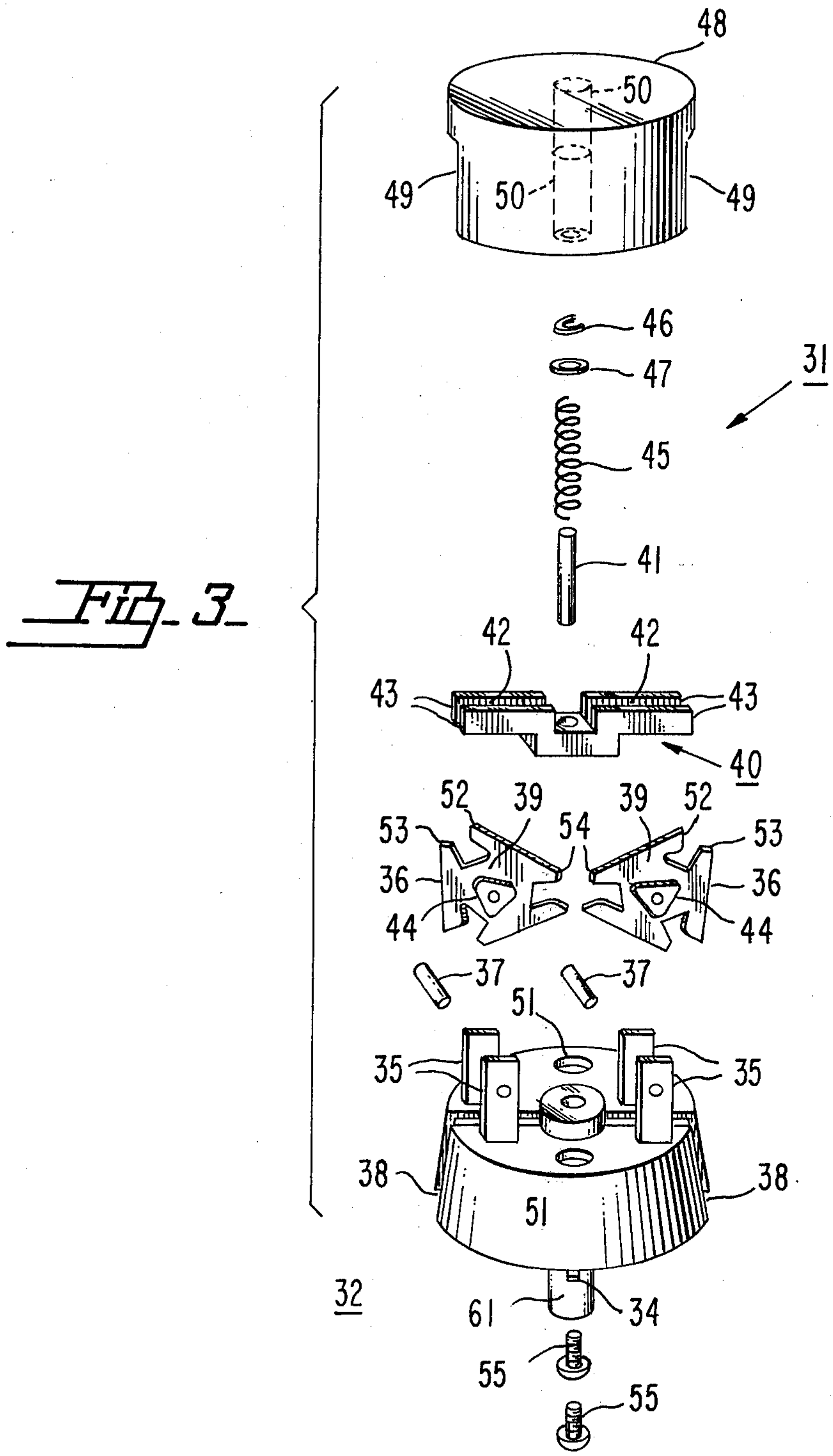
FIG. 3 is an exploded, perspective view of the apparatus for inhibiting a plurality of disc records from being disposed on a turntable while grounding a conductive portion of a disc record disposed on the turntable of FIG. 1.

An apparatus 31 for inhibiting a plurality of disc records from being disposed on a turntable while grounding a disc record disposed on the turntable will now be described with reference to FIGS. 1 and 3. FIG. 3 illustrates an exploded perspective view of the afore-said apparatus 31. A turntable spindle 32 is secured to the turntable 11 by means of a retaining member 33 and a tab 34 in a manner to be described subsequently in conjunction with FIG. 8.

Posts 35 are secured to the turntable spindle 32 for rotatably mounting record-engaging members 36 by means of pivot pins 37. Slots 38 are provided in the turntable spindle 32 for freely receiving web portions 39 of the record-engaging members 36. A beam 40 is mounted to the turntable spindle 32 by a mounting pin 41 for reciprocating movement between the posts 35. The posts 35 prevent rotational motion of the beam 40, while permitting the above-indicated reciprocating motion thereof. Slots 42 are provided in the beam 40 for freely receiving the web portions 39 of the record-engaging members 36. Side walls 43 of the beam 40 rest on peripheral surfaces of cams 44 of the record-engaging means 36. A spring 45 biases the beam 40 in engagement with the peripheral surfaces of the cams 44. A lock nut 46, and a washer 47, secure the spring 45 to the mounting pin 41. A cap 48 encloses the apparatus. Slots 49 are provided in the cap 48 for freely receiving the web portions 39 of the record-engaging members 36. The cap 48 has column portions 50 which rest in the seats 51 provided for securing the cap to the turntable spindle 32.

The operation of the apparatus 31 for inhibiting a plurality of disc records from being disposed on a turntable while grounding a disc record disposed on the turntable will now be described with reference to FIGS. 4–7. FIGS. 4–7 diagrammatically illustrate progressive end views partly in section of the afore-said apparatus, while a disc record 12 is being disposed on the turntable 11 in the playback position centered about the spindle 32.

The record-engaging members 36 have conductive first portions 52, second portions 53, and third portions 54. In this particular embodiment, the record-engaging members 36 are made of conductive material. The conductive first portions 52 of the record-engaging members 36 are electrically connected to a point of ground potential of the playback system of FIG. 1 via the turntable spindle 32.

Figures 4, 5, 6, 7:
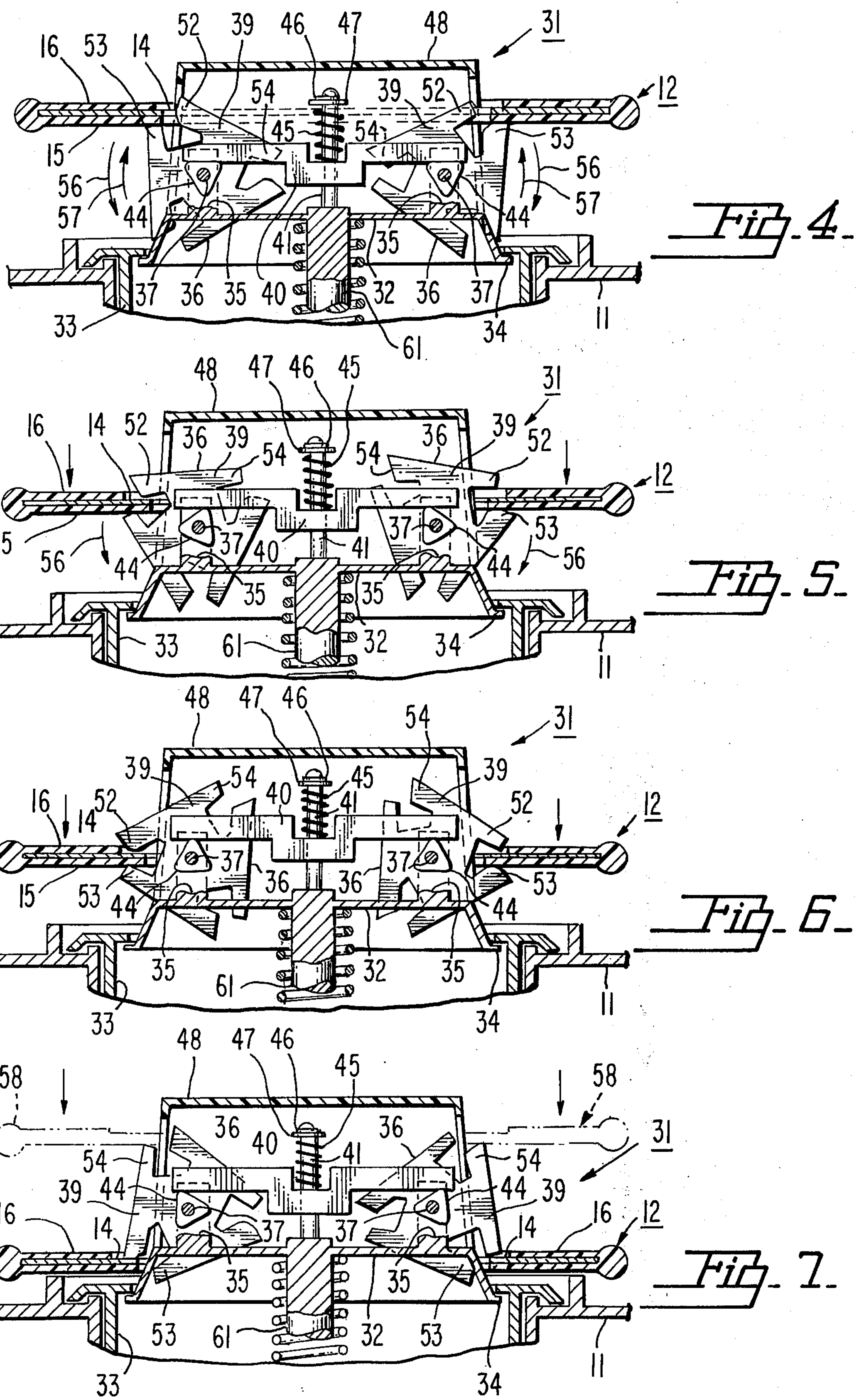
FIGS. 4, 5, 6, and 7 diagrammatically illustrate progressive end views partly in section of the apparatus of FIGS. 1 and 3, along the line X—X in FIG. 1, while a disc record is being assembled on the turntable into a playback position.

The record-engaging members 36 are positionable between (1) an operative first position indicative of an absence of a disc record 12 on the turntable 11 in the playback position as illustrated in FIG. 4, and (2) an inoperative second position indicative of a presence of a disc record 12 on the turntable in the playback position centered about the turntable spindle 32 as illustrated in FIG. 7. It will be noted that when the first disc record 12 is in the playback position on the turntable 11, the engaging members 36 assume the inoperative second position as shown in FIG. 7.

The record-engaging members 36 rotate in (1) a first direction in response to the passage of a first disc record 12 to the playback position on the turntable 11 as shown by an arrow 56 in FIG. 4, and (2) a second direction in response to the passage of the first disc record from the playback position on the turntable as shown by an arrow 57 in FIG. 4.

When the engaging members 36 are in the operative position (FIG. 4) the locations of the second portions 53 of the engaging members are such that if the first disc record 12 is passed along the spindle 32 to the playback position (FIG. 7), the second portions engage the first disc record in order to move the engaging members in the first direction 56 to the inoperative position (FIG. 7).

When the first disc record 12 is placed on the turntable 11 as shown in FIG. 7, the conductive first portions 52 of the record-engaging members 36 extend sufficiently from the turntable spindle 32 to engage the conductive region 14 of the first disc record in order (1) to electrically connect the conductive region which is remote from the turntable to the ground potential of the playback system via the conductive first portions, and (2) to inhibit movement of the engaging members in the first direction 56, thereby preventing a second disc record 58 shown by dotted lines in FIG. 7 from being placed on the turntable.

It will be noted that the spring 45 biases the conductive first portions 52 of the record-engaging members 36 into engaging relation with the conductive region 14 of the first disc record 12 when the first disc record is disposed on the turntable 11, as illustrated in FIG. 7.

When the engaging members 36 are in the inoperative position (FIG. 7) (1) the locations of the third portions 54 are such that if the first disc record 12 is disposed on the turntable 11, the third portions lie in the path of the second disc record 58 to the playback position in order to inhibit the second disc record from being placed on the turntable, and (2) the locations of the first portions 52 are such that when the first disc record 12 is removed from the turntable, the first portions being engaged with the first disc record move the engaging members in the second direction 57 to the operative position.

Pursuant to another embodiment of the present invention, the engaging members are a three-sided body. In this embodiment, the number of operative positions of the record-engaging members 36 is equal to three. The cam 44 is also a three-sided body. The placement of the cam 44 peripheral surfaces in relation to the operative positions of the record-engaging members 36 is such that (1) when a disc record 12 is not present on the turntable 11, the spring 45 urges the record-engaging members to assume one of the operative positions, and (2) when a disc record is present on the turntable, the spring urges the conductive first portions 52 of the record-engaging members in the engaging relation with the conductive region 14 of the disc record, via the beam/cam arrangement.

Figure 8:
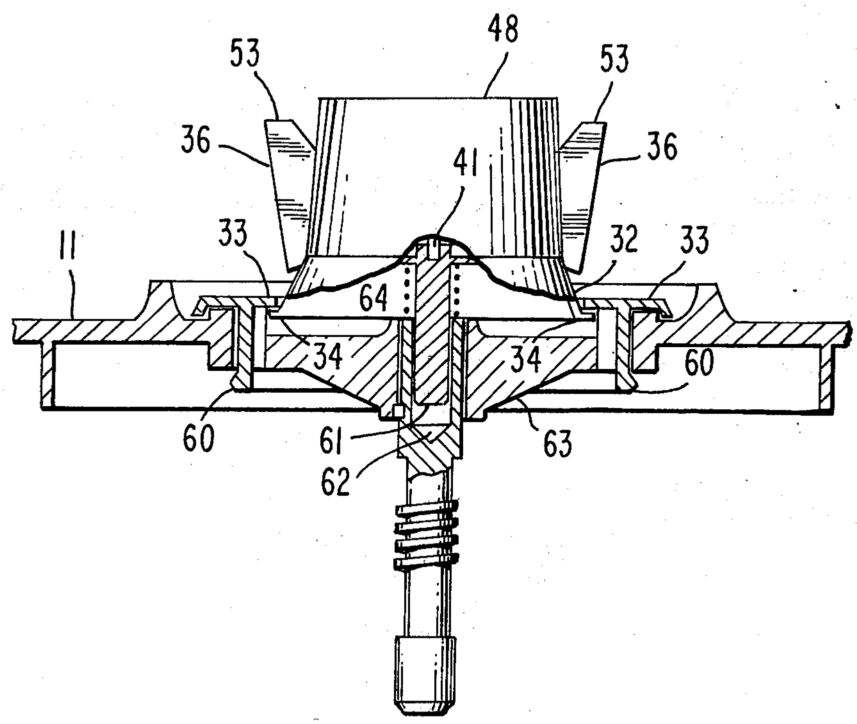
FIG. 8 illustrates details of the assembly of the apparatus of FIGS. 1, 3, 4, 5, 6, and 7 to the turntable.

FIG. 8 illustrates assembly details of the spindle 32 to the turntable 11. It will be noted that the disc record 12 is driven by the turntable 11 through friction therebetween. As indicated previously, the disc record 11 has the thin coating 14 of conductive material which is exposed in a region surrounding the disc record centering aperture for engagement with the conductive first portions 52 of the record-engaging members 36. When the disc record 12 is disposed on the turntable 11 for playback, it is desirable to permit the spindle 32 carrying the record-engaging members 36 to rotate with the disc record independent of the turntable in order to prevent wearing of the thin disc record conductive coating 14 by the engaging member first portions 52 when there is a slippage between the disc record and the turntable. Accordingly, the spindle 32 is secured to the turntable 11 by means of the retaining member 33 and the tab 34. The retaining member 33 is secured to the turntable 11 by means of suitable fasteners 60. The spindle 32 has a shaft portion 61 which is freely received in an opening 62 provided in a hub portion 63 of the turntable 11. It is noted that the retaining member 33 and the tab 34 arrangement permits the spindle 32 to rotate with the disc record 12 independent of the turntable 11 while preventing the spindle from being accidently removed from the player. Further, as the electrical coupling between the disc record conductive coating 14 and the reference potential is accomplished without any relative motion between the record-engaging members 36 and the disc record conductive coating, the life of the disc record is extended.

Additionally, it is advantageous to provide means for accommodating variations in the dimensions of the disc record centering aperture in order to obtain a proper seating and centering of the disc record 12 on the turntable 11. Although close production tolerances are observed in the manufacturing of disc records, some variations in the disc record dimensions will remain. Accordingly, in order to obtain proper seating and centering of the disc record 12 on the turntable 11 (a) the spindle 32 is provided with a tapered portion 52 as more clearly shown in FIG. 3, and (b) means are provided for biasing the spindle in a direction perpendicular to the turntable surface as depicted in FIG. 8.

With regard to the grounding aspect of the present invention, it may be noted that whereas the description above assumes the absence of a dielectric deposit 16 overlying the disc record's conductive coating 14 in the unrecorded regions engaged by the record-engaging members 36, the continuance of thee recorded portion's dielectric deposit into such unrecorded regions (as may result from processes chosen for use in coating of the disc records) may nevertheless normally be accepted without prevention of achievement of the desired grounding action. This is so because the normal thickness of the dielectric deposit 16 is so minute that the spring biased record-engaging members 36 may readily penetrate this deposit to effect contact with the disc record's conductive coating 14.

Thus, it will be seen that an apparatus is provided for inhibiting a plurality of disc records from being disposed on the turntable of the playback system while grounding a conductive region of a disc record disposed on the turntable.

What is claimed is:

1. In a playback system for recovering prerecorded signals from a grooved region of a centrally apertured disc record, said record having an ungrooved region disposed between said grooved region and the walls of said aperture; said playback system including a rotatable turntable; apparatus for inhibiting a plurality of disc records from being disposed on said turntable comprising:

a spindle supported on said turntable in a central location;

a rotatable member mounted within said spindle, said rotatable member having a plurality of record-engaging means disposed about its periphery, each of said plurality of record-engaging means having mutually oppositely directed first and second record-engaging ends;

biasing means cooperating with said rotatable member to establish a rotational position of said member in the absence of encirclement of said spindle by record aperture walls, the position established by said cooperation being any one of a limited plurality of rotational positions; each of said limited plurality of rotational positions locating a respectively different one of said record-engaging means in a location protruding from the periphery of said spindle, with an orientation directing the first record-engaging end of the protruding record-engaging means away from the turntable, and placing the first record-engaging end of said protruding record-engaging means in the path of travel of a record to a position of centered engagement with said turntable;

each of said record-engaging means being dimensioned so that passage of a record to a position of centered engagement with an otherwise unoccupied turntable results (1) initially in engagement of a turntable-facing surface of said passing record with the first recording-engaging end of the protruding record-engaging means, and (2) consequently in rotation of said member to a degree sufficient (*a*) to cause said biasing means to move the second record-engaging end of a record-engaging means adjacent to said protruding record-engaging means into engagement with a surface of said turntable-engaging record opposed to said turntable-facing surface, and (*b*) to intrude the first record-engaging end of said adjacent record-engaging means into said path to obstruct passage of any additional record to a position of centered engagement with the turntable-engaging record.

2. Apparatus as defined in claim 1 wherein the number of said record-engaging means is equal to three; wherein said three record-engaging means are formed of conductive material, and are symmetrically disposed about the periphery of said rotatable member, each of said record-engaging means being of similar dimensions selected so that engagement of said opposing surface of a turntable-engaging record by the second record-engaging end of said adjacent record-engaging means is effected in the ungrooved region of the turntable-engaging record; and wherein said apparatus further includes conductive means for connecting said record-engaging means with a point of reference potential of said playback system.

3. Apparatus as defined in claim 1 wherein said rotatable member includes a cam having peripheral surfaces, and wherein said biasing means comprising:

A. a beam member movably mounted within said spindle and subject to engagement with peripheral surfaces of said cam; and B. a spring member urging the beam member toward the peripheral surfaces of said cam;

wherein the relationship of said cam peripheral surfaces with the rotational positions of said rotatable member is such that the spring member, via beam member engagement with peripheral surfaces of said cam, (1) urges the rotatable member to assume one of said limited plurality of rotational positions in the absence of spindle encirclement by record aperture walls, and (2) in the instance of centered record engagement with the turntable, urges the second record-engaging end of said adjacent record-engaging means in engaging relation with said opposed surface of the turntable-engaging record.

4. Apparatus as defined in claim 1 wherein support of said spindle by said turntable is effected by means normally causing rotation of said spindle in concert with rotation of said turntable; said spindle rotation causing means permitting, however, slippage of said spindle relative to said turntable in the instance of a slippage between a turntable-engaging record and the rotating turntable during engagement of said opposing surface of the turntable-engaging record by one of said record-engaging means.

5. A system as defined in claim 4 wherein said spindle rotation causing means includes a second spring member for biasing the spindle into engagement with the turntable.

* * * * *